(No Model.)

V. H. ERNST.
MILLING MACHINE.

No. 341,437. Patented May 4, 1886.

(No Model.)
V. H. ERNST.
MILLING MACHINE.
No. 341,437.
6 Sheets—Sheet 4
Patented May 4, 1886.
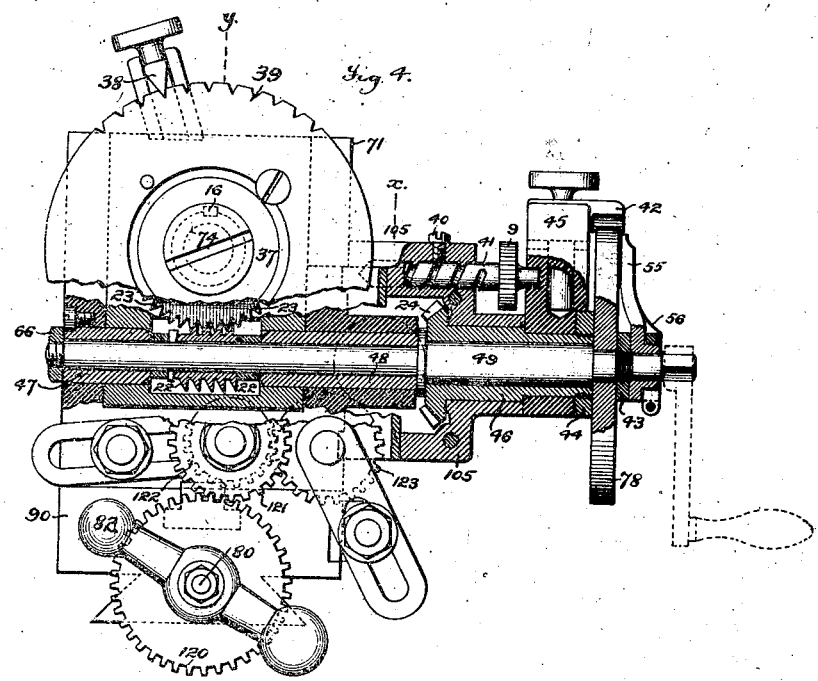
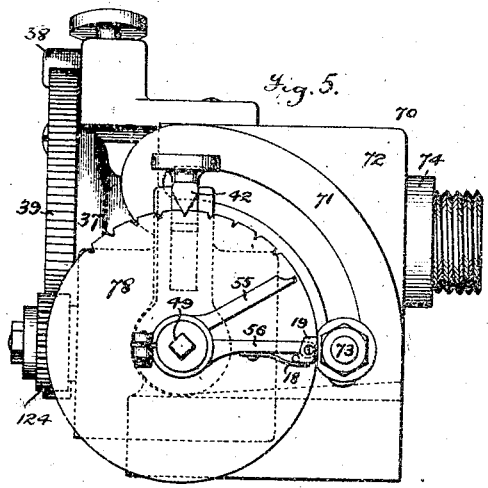
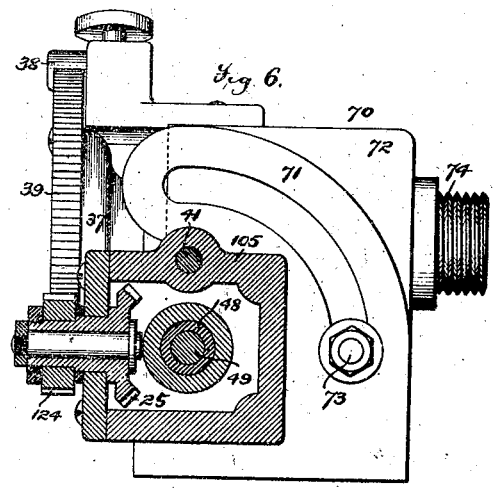
Attest:
Geo. H. Botts
G. W. H. Graham
Inventor:
Victor H. Ernst
Munton & Philipp
Attys.

(No Model.) 6 Sheets—Sheet 5.
V. H. ERNST.
MILLING MACHINE.
No. 341,437. Patented May 4, 1886.
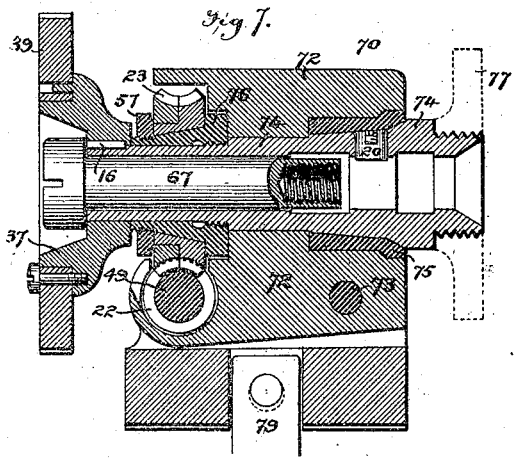
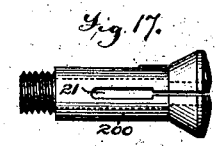
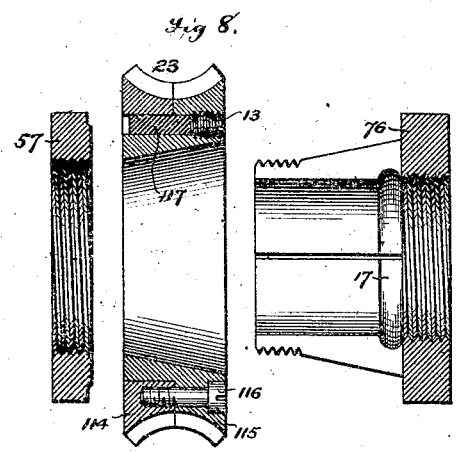
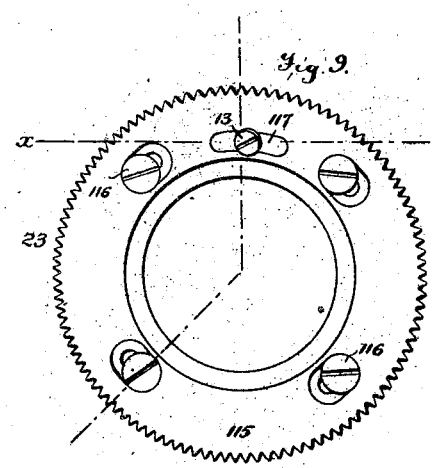
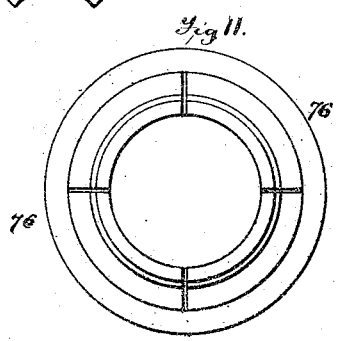
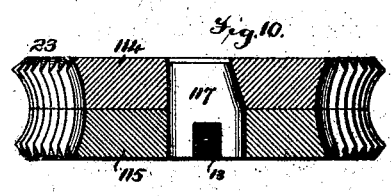

(No Model.)
V. H. ERNST.
MILLING MACHINE.
No. 341,437.  Patented May 4, 1886.
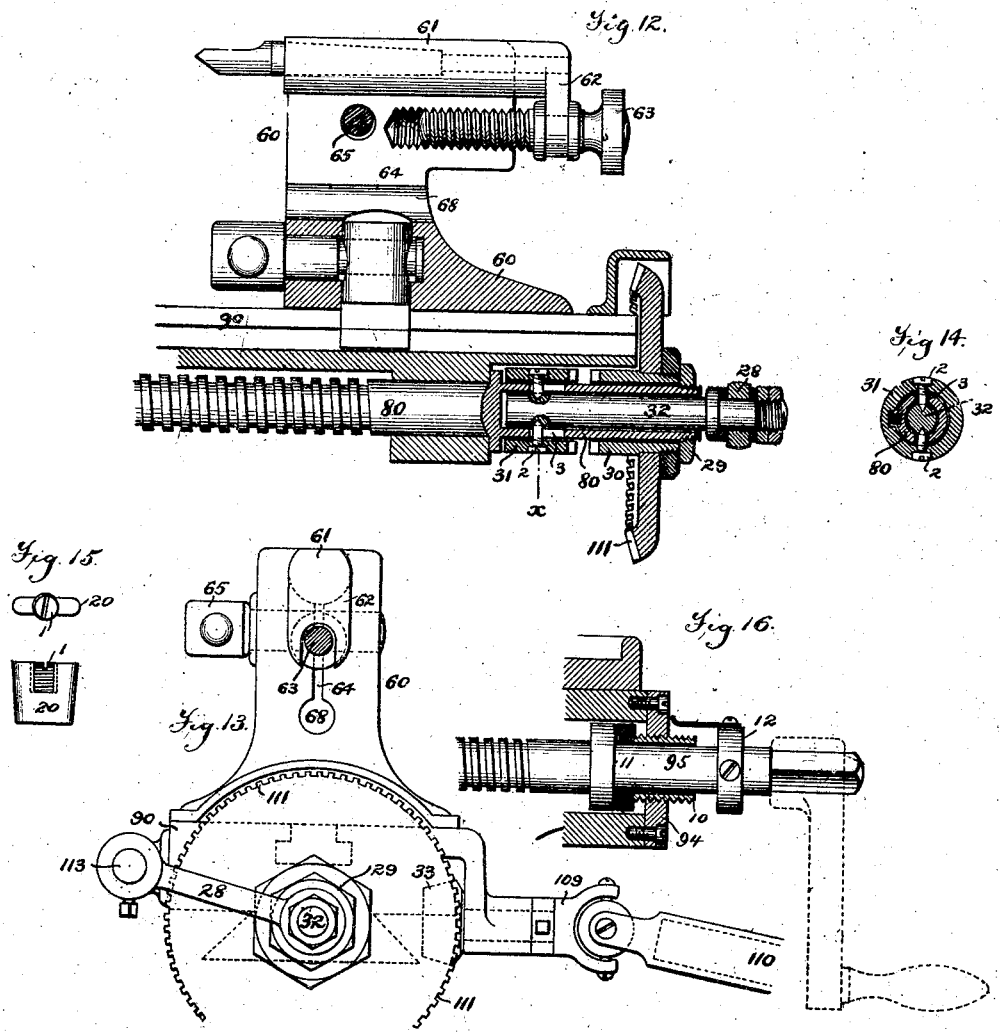

United States Patent Office.

VICTOR H. ERNST, OF JERSEY CITY, NEW JERSEY, ASSIGNOR TO THE BROWN & SHARPE MANUFACTURING COMPANY, OF PROVIDENCE, R. I.

MILLING-MACHINE.

SPECIFICATION forming part of Letters Patent No. 341,437, dated May 4, 1886.

Application filed November 17, 1883. Serial No. 112,121. (No model.)

*To all whom it may concern:*

Be it known that I, VICTOR H. ERNST, a citizen of the United States, and a resident of Jersey City, in the county of Hudson and State of New Jersey, have invented certain new and useful Improvements in Milling-Machines, of which the following is a full, clear, and exact description, reference being had to the drawings accompanying the same, and constituting a part of the specification.

This invention relates, generally, to that class of machines in which a rotary cutter or milling-tool is employed for reducing or imparting certain configurations or cuts to metal articles, appliances, or devices that are held in the machine and fed under such rotating cutter or tool, and particularly to that class of machines patented February 21, 1865, No. 46,521, which, by reason of the great variety of uses to which they are adapted, are technically known as "universal milling-machines."

The present invention is directed to certain improvements on this class of machines, whereby their capacity is increased, the adjustment of the articles operated upon is facilitated, and their operation rendered more effective and perfect.

These improvements consist, among other things, of a novel head-stock, combining, with the ordinary movement of its spindle by a worm and worm-wheel, means whereby said spindle may be moved independently of said worm and worm-wheel; of a head-stock the spindle of which may be operated by either of two independent indexing mechanisms, and embracing a novel construction of the parts for connecting and disconnecting each of the indexing mechanisms to and from said spindle; of a novel means for securing the spindle in the head-stock, and in many details of construction and combinations of devices too fully hereinafter described to need a preliminary description here.

Figure 1:
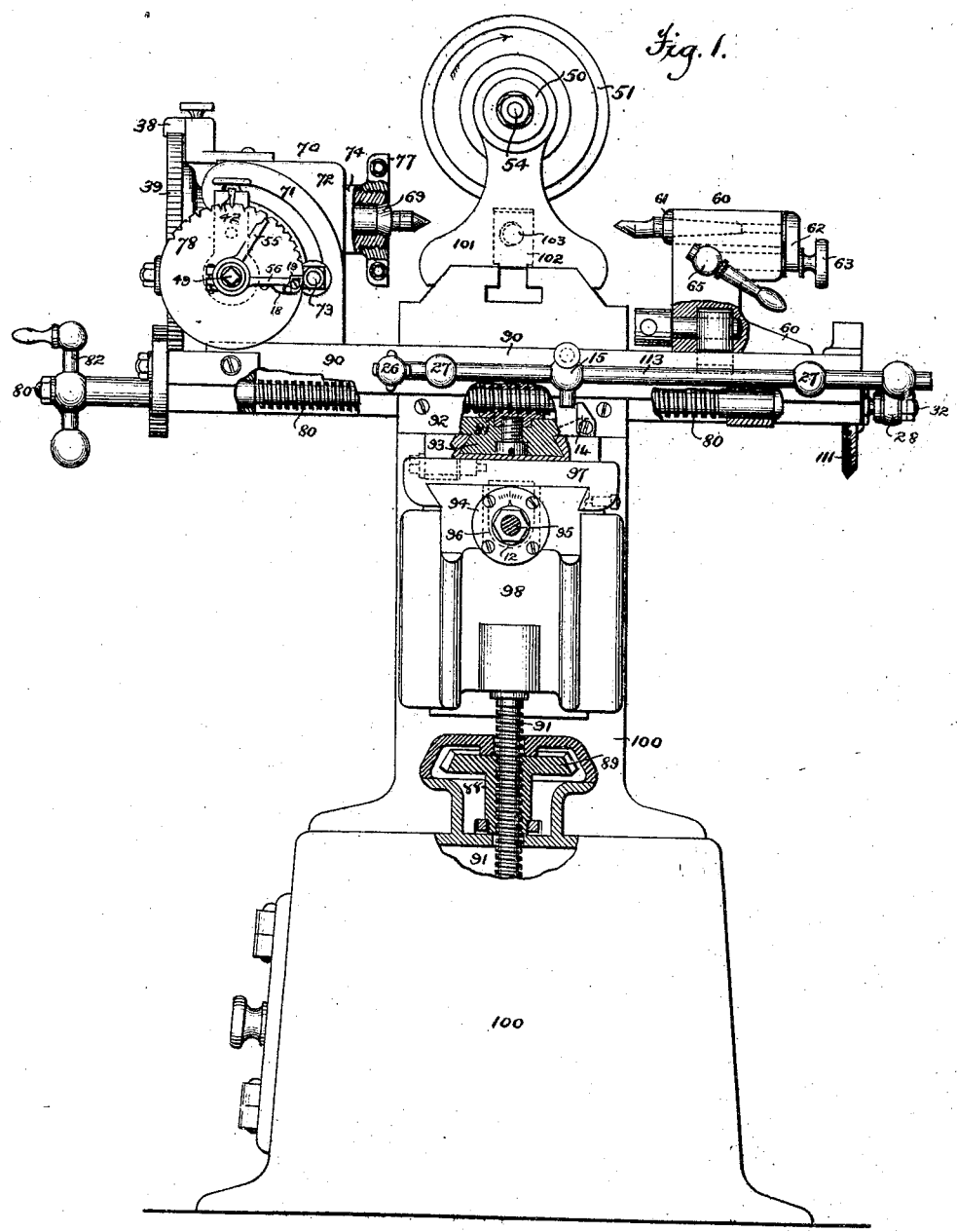
Figure 2:
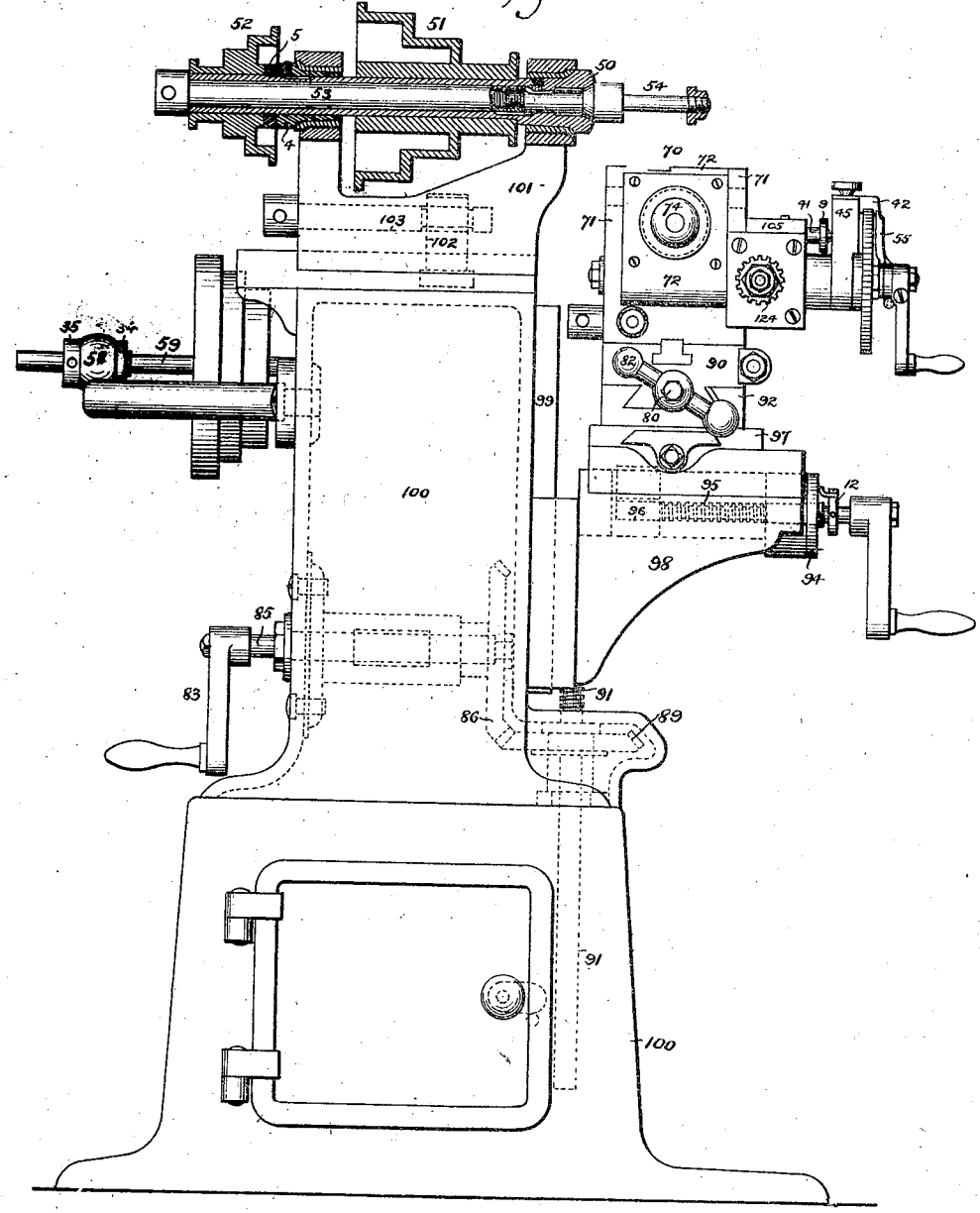
Figure 3:
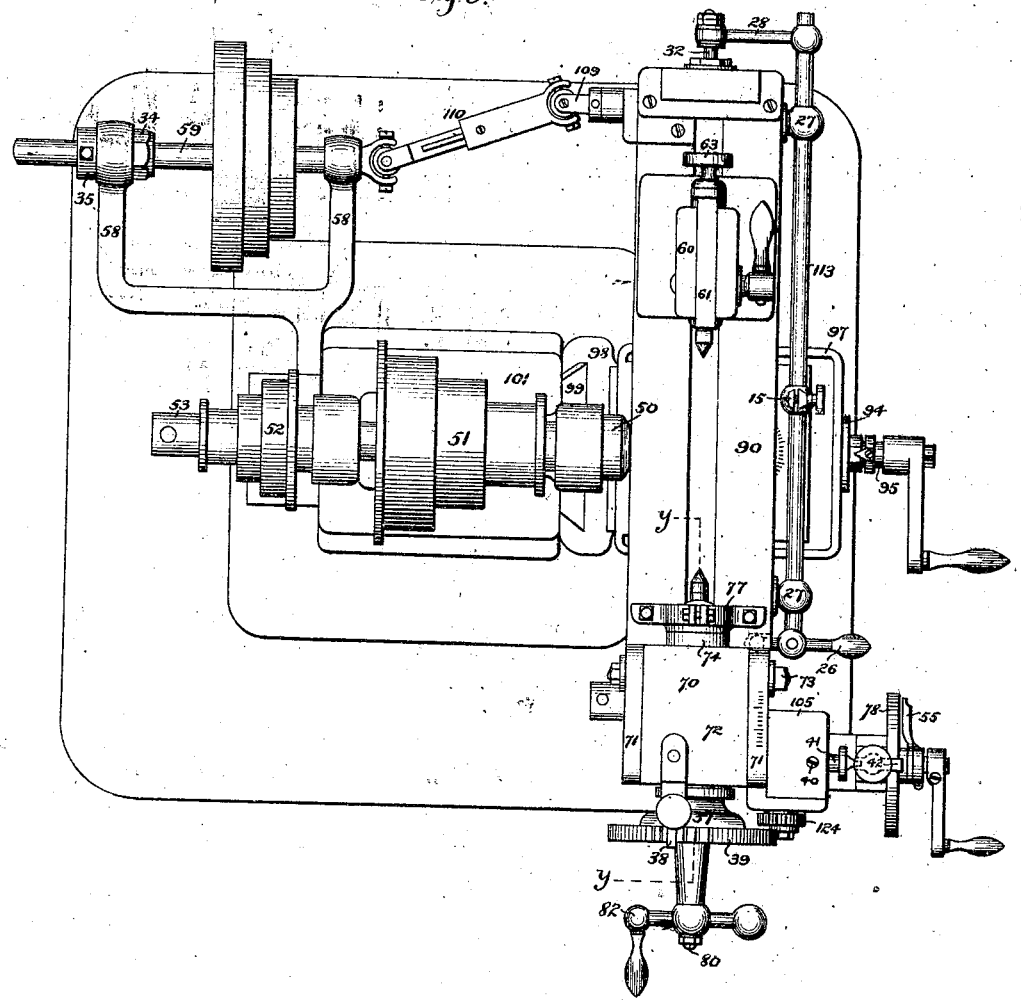

In the drawings, Figure 1 is a front elevation of a milling-machine embodying the present improvements, certain portions being broken away to show some of its interior construction. Fig. 2 is a side elevation thereof, the main spindle and its immediate connections being shown in section, and some of the gears connecting the feed-screw with the worm-shaft of the indexing-head and the direct indexplate being omitted. Fig. 3 is a plan view of the milling-machine complete. Fig. 4 is an enlarged side elevation of the head-stock, partly in section, showing particularly the worm-shaft of the slow or indirect indexing system, its construction and connections, and the connections with the feed-screw shaft by which the spindle is automatically rotated. Fig. 5 is a front elevation of the head-stock. Fig. 6 is a vertical section of the same, taken on the line $x$ of Fig. 4, showing particularly the relation of the bevel-wheel to the worm-shaft for automatically rotating it. Fig. 7 is a longitudinal vertical central section of the headstock, taken on the line $y$ of Figs. 3 and 4, showing particularly the construction and arrangement of the spindle, its worm-wheel, and immediate connections. Fig. 8 represents by a central section the worm-wheel, the retaining-nut of the head-stock spindle, and the nut for clutching the worm-wheel to the spindle separated from each other. Fig. 9 is a rear elevation of the worm-wheel, and Fig. 10 a sectional view of the same, taken on the line $x$ of Fig. 9. Fig. 11 is an end elevation of the retaining-nut of the head-stock spindle. Fig. 12 is a central sectional elevation of the foot or tail stock, the end of the feed-table, its feed-screw shaft, and its driving bevel-wheel. Fig. 13 is an end elevation of the same, the adjusting-screw of the tail-stock spindle being in section; and Fig. 14 is a cross-section of the feed-screw shaft and its clutch detached from the feed-table. Fig. 15 illustrates the compressible key detached from the spindle. Fig. 16 is a central vertical section of a portion of the elevating-carriage, showing particularly the cross-feed screw-shaft and its front bearing; and Fig. 17 is an elevation of a spring-chuck.

The milling-machine, as illustrated by Figs. 1, 2, and 3, will be seen, broadly considered, to be of the same general construction and arrangement as those now well known in the art. It consists, as herein shown, of a rectangular column or standard, 100, provided on its vertical face with a dovetail guide, 99, by which the elevating-carriage 98 is supported and guided in its vertical adjustments, and on its horizontal upper face with a seat having a rearward extension for supporting the main head 101 of the cutter or mill-carrying spindle 50. This main head 101 is of common form, and is securely held to said seat by a T-stud, 102, seated in a recess formed in the under side of the head and operated to securely hold the main head to its seat or loosen it therefrom by a cam-bolt, 103. By thus mounting the main head it will be seen that it may be loosened from its seat and drawn rearward away from the article being milled, so that it may be inspected without changing the position of the feed-table.

The spindle 50 is held in suitable bearings provided in rising arms of the main head, and supports between said arms a stepped or cone pulley, 51, and on its extreme rearward end a second stepped pulley, 52. This spindle is hollow, as is common in many machines, adapting it to receive from its rear end the ordinary "draw-in" or tightening spindle, 53, adapted to engage with the screw-threaded end of an arbor, chuck, or other cutter or tool holding device, 54, that is inserted within the spindle at its front end. The spindle in passing the rear bearing is provided with a sliding taper sleeve, 4, fitting within the bushed bearing and held to the spindle so as to turn therewith, by a screw engaging with a short longitudinal slot formed in the spindle and held to duty within the bushed bearing by a nut, 5, whereby any wear between the front bearing and the spindle is compensated for.

The elevating-carriage 98 is provided on its inner vertical face with a dovetail recess, which embraces the dovetail guide 99 on the face of the column, as before described. This carriage on its upper horizontal face is provided with a dovetail seat and guide that is engaged by a similarly-shaped recess formed in the under side of a saddle or cross-feed slide, 97. The under side of this cross-feed slide is also provided with a screw-threaded nut, 96, depending therefrom into a recess formed in the upper face of the carriage, which is engaged by the threaded portion of an operating screw-shaft, 95, (see Figs. 1 and 2,) which is mounted in bearings in the upper portion of the carriage, and adapted to move the said slide 97 and the devices it supports horizontally toward and from the column 100. This operating screw-shaft (see Fig. 16) is provided with an adjusting sleeved nut, 10, engaging with threads in the face-plate 94, at the inner end of which is a friction-washer that abuts against a shoulder provided upon the screw-shaft, by which nut any lateral movement thereof caused by the wear of its bearings may be compensated for. The shaft 95 is furthermore provided with a collar, 12, adjustably fixed thereon and supporting an index that operates in connection with graduations on the face plate (see Fig. 1) to enable the operator to determine the exact distance with respect to the position of the milling-tool that the cross-feed slide is adjusted. The upper portion of this cross-feed slide 97, which has the usual gutter for catching the oil-drip from the devices supported above it, is provided with a circular dovetail recess, in which takes a like-shaped projection, 93, formed on the under side of a swivel holding-plate, 92, that rests upon the upper face of the slide 97, and which swivel holding-plate is provided on its upper face with a longitudinal dovetail recess that embraces a like-shaped projection formed longitudinally on the under side of a feed-table, 90, as is common.

The parts just described are elevated or lowered vertically by means of a vertically-arranged screw-shaft, 91, the upper end of which extends into a recessed lug or projection formed at the lower extremity of the elevating carriage 98. This screw-shaft extends downwardly through the screw-threaded hub 88 of a bevel-wheel, 89, that turns in a fixed housing. Motion is communicated to said bevel-wheel 89 to drive the screw-shaft 91 by a bevel-wheel, 86, through a shaft, 85, and winch 83. In larger sized machines, when the distance from the front to the rear is too great to expediently operate this carriage-elevating device simultaneously with that of the cross-feed slide, it will be placed at the side of the column to the left hand, instead of at its rear.

The feed-table 90 is of common form, extending crosswise horizontally in front of the column 100. It is provided with the usual horizontal feed-screw shaft, 80, that is engaged by a nut, 81, carried by the swivel-plate 92, (see Fig. 1,) whereby when the feed-screw shaft is turned, either by the handle 82, or otherwise, the feed-table will be moved horizontally to the right or left. The feed-table 90 carries at one end of its upper face a combined head-stock and indexing head, 70, and at or near the opposite end a foot or tail stock, 60.

The head-stock 70 is fixedly secured in position upon the feed-table in any convenient manner—such, for instance, as the T-stud 79, (see Fig. 7,) and a cam-bolt similar to that before described—and said head-stock consists, as is usual, (see particularly Figs. 4 to 7,) of a bisected stock, 71, in which is mounted a pivoted head, 72, that is provided with the ordinary bolt, 73, extending from either side thereof into curved slots cut in the walls of the stock 71, and provided with a clamping-nut to rigidly secure the adjusted position. This pivoted head 72 is provided with a hollow spindle, 74, which bears at its front end against a conical bushing, 75, and at its rear end is secured in place by a retaining-nut, 76, hereinafter more fully described.

The front end of the spindle 74 will in practice be screw-threaded exteriorly to receive a face-plate, 77, or other means adapted (see Fig. 1) for holding a "lathe-dog," as is well understood, while the hollow portion of the spindle will be adapted to receive at its front end a chuck, as 69, or as 200, Fig. 17, and at its rear end a draw-in spindle, 67, for securing the chuck rigidly in place.

To hold the chuck from turning in the spindle, the latter is provided with a spline or key, 20, Figs. 7 and 15, that engages with a slot in the chuck. This key is cut on a very slight taper, so that as its adjusting-screw 1 is turned it is wedged to its seat, and in so doing, by reason of the recess or slot in its upper end for the screw being slightly elastic, will tend to bind the screw and itself in its seat.

The chuck 200, Fig. 17, is adapted to hold straight work, such as round rods and the like, and has an improved construction. It is provided with the ordinary taper faced bearing-head, a straight shank, and a screw-threaded end. It is also bored centrally and has radial dividing-slots adapting its forward end to receive and hold the work. At about midway of its length these radial slots are recessed to form enlarged openings 21, which render each jaw of the chuck very elastic and capable of easy adjustment in their operation.

The adjustable tail-stock 60 (see Figs. 12, 13) is provided in its upper part with a curved seat for the reception of a tail-stock spindle, 61, which carries a taper shank center projecting from one end, and at the opposite end is formed with a depending projection, 62, bifurcated to straddle an adjusting screw, 63. This tail-stock is pierced centrally of its width by a vertical slot, 64, extending from the curved seat to an enlarged opening, 68, by which division the separated sides thereby formed are rendered slightly elastic, to facilitate the securing of the spindle 61 in place by the action of the bolt 65, after the proper position of the spindle has been effected by the adjusting-screw 63.

The mechanism by which the rotations of the spindle 74 and its connections are indicated or determined, either step by step or continuously in making spiral cuts, is known as the "indexing" mechanism, which in the present improvements is duplex in construction—that is to say, the head-stock 70 is provided with two means for indicating the rotations or partial rotations of the spindle 74 and its connections, by one of which the rapid or greater partial rotations of the spindle may be indicated or determined through an index applied directly to said spindle, and by the other the slow rotations, so as to obtain a movement much finer in degree, of the spindle, may be indicated or determined through an index mounted independent thereof, but communicating its movements by a worm and worm-wheel; and while these duplex indexing mechanisms are designed to be employed separately one from the other, it will be seen that in using the last-named indexing mechanism the index-plate of the other may be employed in conjunction therewith, and thus serve as a tally by which any error in rotating the spindle by the one may be detected by watching the index-plate of the other.

Referring particularly to Figs. 4 to 7, the indirect indexing mechanism consists of a short horizontal shaft, 49, arranged below and at right angles to the spindle 74 of the head-stock 70, and supported therein by bearings formed by the sleeves 47, 48, and 46, the two former of which are seated in bearings formed in the stock 71 and its head 72, and serve as the pivots on which said head may be tilted when required. Between said sleeves and short collars on the shaft 49 is provided a worm, 22, splined thereto and having a locking space and key, which worm engages a worm-wheel, 23, mounted on and carried by the spindle 74. The sleeve 47 is held in position in the head-stock by a screw, the head of which fits in a recess in the end of said sleeve and in the head-stock, by which any wear between the sleeves and the worm may be taken up from time to time, as occasion may require, a nut, 66, being provided to secure the shaft 49 in position. The sleeve 46 is held in bearings formed by a bracket, 105, projecting from the front side of the stock 71, and this sleeve 46 is provided at its inner end with a bevel-wheel, 24, that bears against a shoulder formed on the shaft 49. The opposite end of this sleeve 46 supports a yoke, 45, that extends upwardly alongside of and in rear of the index-plate 78, said yoke being securely held upon the sleeve by a nut, 44, screwed on to its threaded end, so as to turn therewith, as will hereinafter appear.

The index-plate 78 is provided on its periphery with any suitable number of equidistant serrations or notches, and is secured in place upon the shaft 49 by a nut, 43, bearing against its front face. Upon this shaft 49, in front of the index-plate, there are provided two sector arms, 55 and 56, the former of which, mounted directly on the shaft, is provided with an extending hub, over which the split sleeve of the other sector-arm 56, is mounted, so as to be capable of rotary adjustment thereon by means of its tightening-screw, by which the distance between the ends of the arms may be adjusted and secured for purposes too well known to need detailed description herein. The outer end of the arm 56 is provided with a stop, 19, pivotally secured thereto and constantly held in its normal position by a spring, 18, whereby it may be moved in one direction in passing the projecting end of the pawl or catch 42.

The shaft 49 may be squared at its projecting end and provided with a crank by which it may be rotated; or it may be operated through its index-plate 78.

The yoke 45 is provided with a spring-seated pawl or catch, 42, (spring not shown,) which overlies the periphery of the index-plate 78, and engages with the serrations or notches provided therein. The shank of this catch projects into a vertical seat or opening provided in the upper portion of the yoke, which is also partially cut away at its upper end to form slots adapted to receive the squared portions formed on the catch 42, by which the latter is guided vertically, so that its engaging end will always be presented over the index-plate.

Over the shaft 49 and sleeve 46 the bracket 105 is provided with a recess, in which is seated the long end of a holdfast-stud, 41, that has a spiral groove with which a holding-screw, 40, engages. The opposite end of the holdfast-stud projects into a bearing formed in the rear of the yoke 45, and said stud is provided with a thumb-piece or operating-disk, 9, by which it may be turned to disengage it from the yoke in the adjustment necessary to impart a spiral movement to the work.

The shaft 49 will ordinarily rotate by lifting the pawl 42 out of engagement with the index-plate independently of the sleeve 46 and its bevel-wheel 24; but when this mechanism is adjusted to automatically impart a spiral movement to the article being milled, aided therein by the lateral feed-movement of the table 90, this shaft, sleeve, and bevel-wheel will be coupled together by releasing the yoke 45 from its fixed position secured by the holdfast-stud, and allowing the pawl 42 to remain engaged with a notch in the index-plate 78, as will be apparent.

The worm-wheel 23, which the worm 22 engages, (see Figs. 7 and 8,) is provided with a conical central bore, and is mounted on a like-shaped hub projecting from the retaining-nut 76 on the spindle 74, and is clutched thereto so that its rotations are imparted to the latter by a nut, 57, which engages with screw-threads provided on the end of said hub. This hub of the retaining-nut 76 is preferably divided, so as to form elastic sections extending from its rear, and has an annular recess, 17, by which greater elasticity is imparted thereto, so that when the nut 57 is screwed thereon it will bind said sections firmly upon the spindle and lock the nut thereto.

The rapid indexing mechanism is provided by mounting an index-plate, 39, on the rear end of the spindle 74, and a spring-seated pawl or catch, 38, that takes into serrations or notches in the periphery of said index-plate. This index-plate 39 consists of an annular plate fitted onto a circular shoulder provided on a hub, 37, and secured thereto by a steady-pin and set-screws, so that the index-plate in use may be readily removed and replaced by a similar plate having differently-graduated notches without removing the hub from the spindle.

The pawl or catch 38 is similar to the one 42, and needs no further description.

There is provided, as is usual, a mechanism for imparting a continuous rotary movement to the feed-screw shaft 80, for causing the feed-table 90 to traverse under the milling or cutting tool. This is effected by a pulley-driven shaft, 59, (see Figs. 2 and 3,) that is supported in the ends of arms 58, motion being transmitted thereto from the pulley 52 on the main spindle. At one of the bearings of this shaft 59 it is provided with a device for preventing its endwise motion and permitting adjustment, which consists of a sleeve having a hub, 35, that rests against one side of the arm 58, and having a set-screw for securing it to the shaft, and the other end of the sleeve has a nut, 34, bearing against the opposite side of the arm. An extensible shaft, 110, couples the shaft 59 to the shaft 109 by means of universal joints. The shaft 109 carries a spur-pinion, 33, that engages with and drives a bevel-wheel, 111, secured to the end of a sleeve, 30, mounted upon the feed-screw shaft 80. (See Fig. 12.) This feed-screw shaft is hollow for a short distance, and supports within it a short shaft, 32, that is secured by screws 2, that pass through slots 3 therein to a sleeve, 31, mounted on the hollow portion of said screw-shaft, and forming one member—the sliding one—of a clutch, which sleeve is splined to the screw-shaft (see Fig. 14) so as to revolve therewith, while the other or fixed member of the clutch is formed by the sleeve 30. Lateral sliding movement is imparted to the shaft 32 and its member of the clutch, so as to couple and uncouple the bevel-wheel 111 to and from the screw-shaft 80 by means of an arm, 28, projecting from and adjustably mounted on a shifting-rod, 113, which is mounted to slide in bearings 27, projecting from the front of the feed-table, and extends thereat toward the head-stock 70, (see Fig. 3,) and at its end is provided with a pivoted hand-lever, 26, one end of which lever, of globular form, is seated in a depressed seat provided in the front of the feed-table. In order to accomplish the lateral movement of the shifting-rod automatically, it is provided with an adjustable arm, 15, adjustably fixed thereon by a thumb-screw. In connection therewith the swivel-plate 92 is provided with a pivoted dog, 14, which, when in its operative position, (shown in full lines in Fig. 1,) will be met by the arm 15 during the movement of feed-table 90, thus arresting the movement of the shifting-bar, which, as the feed-table moves a slight distance farther, will result in disconnecting the clutch, and thereby stop the further onward movement of the table.

The shifting-bar 113, mounted in the manner described, presents many features of improvement over that usually employed, in that it is supported away and out of contact with the feed-table instead of being held in a groove formed in its front side, whereby its movements in coupling and uncoupling the clutch will not be impeded by an accumulation of grit and chips from the machine.

The pivoted dog, it may be remarked, when the movement of the feed-table is reversed by hand, will be turned into the position shown in dotted lines in Fig. 1, so that the arm 15, whatever its position may be on the shifting-bar, will not come in contact with said dog; and, furthermore, instead of thus pivoting the dog 14 so that it can be adjusted out of operative position, the arm 15 may be provided with an elongating-thimble, so that the length of the depending portion of the arm may be adjusted to either cause it to come in contact with the dog or to escape the latter, as desired.

In the practical operation of the milling-machine employing the indirect indexing mechanism, the piece of metal or article to be milled or otherwise cut will be supported between the head and tail stocks by suitable holding devices with which said stocks are provided, so that it will be caused to turn upon the foot-stock center revolved by the spindle 74 when it is rotated, as is well understood. A cutter or milling-tool of the desired shape will be secured upon the arbor 54, and an index-plate, 78, having the required subdivisions, will be secured in place upon the shaft 49, so as to be engaged by the pawl 42, whose carrying-yoke 45 is fixed in its vertical position by the holdfast-stud 41. Upon rotating the shaft of the main spindle appropriate motion will be communicated to the shaft 59, and thence to one member of the clutch through pinions 33 111. The feed-table having been adjusted vertically by its elevating mechanism, crosswise by its cross-feed mechanism, and laterally through the medium of a handle, 82, Fig. 1, the article to be milled will be in proper relative position to be acted upon by the revolving milling-tool or cutter. The shifting-bar 113 will then be moved so as to cause the moving member of the clutch to be coupled to said pinion 111. Thereupon the feed-screw shaft is rotated and motion imparted to the feed-table, thereby carrying the article to be milled under and in contact with the rotating milling-tool. The feed-table will continue to move until its arm 15 abuts against the dog 14, (the position of said arm on the shifting-bar having been adjusted so as to come in contact with the dog 14 when the milling-tool had completed its cut,) and thus cause the shifting-bar to be shifted, the clutch uncoupled, and the onward movement of the feed-table arrested. The feed-table is then brought back to its starting position by rotating the handle 82. The index-plate 78 will then be partially rotated, after temporarily lifting the pawl 42, and impart a similar movement to the shaft 49 and worm 22, and through the worm-wheel 23 to the spindle 74, whereby the work is likewise rotated an appropriate distance to present a new surface to be acted upon, determined by the movement of said index-plate, which position will be secured and indicated by the pawl engaging a proper notch. The shifting-bar 113 is then shifted to couple the clutches, as before described, when the operation will be repeated until the desired number of cuts have been formed in the work operated upon.

When it is desired to form spiral cuts in the work, the worm shaft 49 will be caused to rotate continuously, whereby the work is similarly moved in addition to the lateral feeding movement before described. This continuous rotation is accomplished by providing a bevel-wheel, 25, mounted within the bracket 105 in engagement with the bevel-wheel 24, before described. The shaft of this wheel 25 is provided with a wheel, 124, (see Fig. 6,) which receives motion from a wheel, 120, secured on the feed-screw shaft 80, (see Fig. 4,) through a pair of intermediate wheels, 121 122, and a single intermediate, 123, from which it will be seen that simultaneously with the lateral movement of the feed-table imparted through the feed-screw shaft 80 said screw-shaft will, through its wheel 120, intermediates 121 122 123, wheel 124, and bevel-wheels 25 and 24, impart a continuous movement to the worm-shaft 49, and through the worm 22 and worm-wheel 23 to the spindle 74. In this operation, however, instead of removing the index-plate 78, which has no function during the formation of the spiral cut, (further than that after each cut it is rotated to move the article being cut the distance required between each cut,) the yoke 45 and its pawl 42 will be released by withdrawing the end of the holdfast-stud 41 from engagement therewith, so that said yoke will be free to move with the index-plate, and thus couple the sleeve 46 of the bevel-wheel and the shaft 49 together, and thus impart the automatic rotations of the former to said shaft. During the rotations of the spindle, effected in this manner or in the manner previously described, the index-plate 39 may be either removed from its hub, or its engaging pawl 38 may be rendered inoperative. Yet it may be observed that during the operation of the spindle 74, previously described, wherein the index-plate 78 is employed to rotate the same, said index-plate 39 may be also used as a tally to the rotation of the index-plate 78, so that any error in moving the latter will be detected by noting the movement of the plate 39. In such case the serrations, notches, or subdivisions on the plate 39 will be such as to correspond to the movement of the spindle 74, imparted by the worm and wheel, as is apparent.

In rapid indexing, wherein a single revolution of the index-plate will likewise complete a revolution of the spindle and the work it supports, the worm 22 will be rendered inoperative and out of connection with said spindle by loosening the nut 57, (see Figs. 7 and 8,) so as to unclutch the worm-wheel 23 from the spindle or cause said wheel to become loose on the conical seat of the hub of the retaining-nut 76, and thus enable the spindle to be rotated step by step through its index-plate 39. In thus rendering the indirect indexing mechanism inoperative no other adjustment of the parts will be necessary, as, by reason of the conical seat upon which the worm-wheel 23 is held by the nut 57, by simply loosening said nut the worm-wheel will naturally follow the nut, and thus when the spindle, and with it the retaining-nut, is revolved said worm-wheel will remain idle. The nut 57, it may be observed, will be prevented from working off from the end of the split sleeve of the retaining-nut 76 by the hub 37 of the index-plate 39, as will be readily seen.

While the direct index-plate will in practice be employed to impart the direct rotations or direct partial rotations to the spindle 74, the latter may be provided at its rear end with a crank for so doing.

I do not limit myself to the specific means for clutching the worm-wheel and spindle together, as it is apparent that they may be modified in many particulars.

For the purpose of compensating for any wear which may occur between the teeth of the worm 22 and the teeth of the worm-wheel 23, the latter is divided so as to form two sections, 114 115, Figs. 8 and 10, and provided with means for readily adjusting them with respect to each other. These sections are secured together so as to form a complete worm-wheel, and yet permit the peripheral adjustment of one with respect to the other by binding-screws 116, that are received in countersunk slots in the section 115, and enter tapped holes provided in the section 114.

The section 115 of the worm-wheel is provided with a slot, into which takes a wedge-shaped adjusting-key, 117, the inclined face of which enters and bears against the inclined face of a groove or opening cut in the interior surface of the section 114, the key 117 being secured in place and adjusted by means of a set-screw, 13, which is received in a recess provided therein. The screw, being larger in diameter than the key, will take into threads provided on the opposite walls of the slot, so that by turning said screw the inclined face of the key abutting against a like face of the groove, will cause the section 114 to move concentrically over the hub of its companion section 115, and thus the worm-teeth of one section will be caused to lap slightly beyond those of the other, so that the width or cross-section of the teeth will be thereby increased and their wear compensated for.

What I claim is—

1. A milling-machine provided with a secondary or supplementary indexing mechanism on its spindle, substantially as described.

2. In a milling-machine, the combination, with a spindle provided with a worm-gear loose thereon and a worm-shaft having a worm, of devices for securing the worm-gear to the spindle, all substantially as described.

3. The combination, with a spindle having a worm-gear loose thereon and devices for securing the worm-gear to the spindle, of an index-plate attached to the spindle and a worm-shaft and worm, all substantially as described.

4. A milling-machine head provided with a spindle adapted to rotate therein, and having a worm-gear loose thereon, and devices for securing said worm-gear to the spindle, combined with an index-plate secured to the spindle and a spring-acting index pawl or catch adapted to engage the index-plate, all substantially as described.

5. In a milling-machine the head-stock whereof is provided with a revoluble spindle, the combination therewith of two independent indexing mechanisms, by either of which the rotations or partial rotations of said spindle may be indicated or determined, one of said indexing mechanisms being applied directly to the spindle and the other indirectly through a worm and worm-wheel, substantially as described.

6. The combination, with a revoluble spindle, as 74, provided with a worm-wheel adapted to be secured to or loosened therefrom, of a worm-shaft carrying a worm engaging with said worm-wheel, whereby said spindle may be rotated either through said worm and wheel or independently thereof, substantially as described.

7. The combination, with a head-stock having bearings for a spindle and provided with a shoulder, of a spindle having a worm-wheel loose thereon, a retaining-nut, as 76, secured to the spindle between the shoulder of the head-stock and the worm-wheel, and a nut, as 57, substantially as described.

8. The combination, with a revoluble spindle, as 74, provided with a worm-wheel adapted to be secured to or loosened therefrom, of an index-plate secured to said spindle and a worm-shaft carrying a worm engaging with said worm-wheel, substantially as described.

9. The combination, with a head-stock provided with a revoluble spindle, as 74, having a worm-wheel adapted to be secured to or loosened therefrom, and a worm-shaft carrying a worm engaging with said worm-gear, of an index-plate secured to said spindle and a pawl or lock mounted on the head-stock and adapted to engage the index-plate, substantially as described.

10. In a milling-machine, an exteriorly-threaded spindle, a retaining-nut which is interiorly threaded at one end and exteriorly threaded at the opposite end, encircling the spindle, a wheel encircling the ring or nut, and a nut which is adapted, as described, to engage the exteriorly-threaded end of the retaining-nut, which at its opposite end is interiorly threaded, all in combination.

11. In a milling-machine, a retaining-nut which is interiorly threaded at one end and exteriorly threaded at the opposite end, and which is annularly grooved and longitudinally slotted, substantially as described.

12. The combination, with the head-stock 70 providing bearings for a spindle, of the spindle 74, the retaining-nut 76, the worm-wheel 23, and the nut 57, substantially as described.

13. The combination, with a revoluble spindle, as 74, provided with a worm-wheel, of a retaining-nut, as 76, securing said spindle in its bearings, and providing a seat for the worm-gear, substantially as described.

14. The combination, with a revoluble spindle, as 74, provided with a worm-wheel, of a retaining-nut, as 76, for securing the spindle in its bearings, and having a conical hub providing a seat for the worm-wheel, substantially as described.

15. The combination, with a revoluble spindle, as 74, provided with a worm wheel, of a retaining-nut, as 76, for securing the spindle in its bearings, and having a divided hub, and a nut, as 57, for locking said retaining-nut to the spindle, substantially as described.

16. In a milling-machine, the combination of an exteriorly-threaded spindle, 74, a retaining-nut, 76, encircling such spindle, a wheel, 23, encircling the retaining-nut, and a nut, 57, which encircles the exteriorly-threaded end of the retaining-nut 76, substantially as described.

17. The combination, with a revoluble spindle, as 74, provided with a worm-wheel, of a retaining-nut, as 76, for securing the spindle in its bearings, and having a conical divided hub providing a seat for the worm-wheel, and a nut, as 57, for locking said retaining-nut to the spindle and securing said worm-wheel to its seat, substantially as described.

18. The combination, with a worm-wheel, as 23, of a revoluble spindle, as 74, having a conical seat for supporting the worm-wheel, and a nut, as 57, for securing said worm-wheel to the shaft, substantially as described.

19. The combination, with a revoluble spindle, as 74, of the retaining-nut, 76, provided with a split hub, and a nut, 57, for clamping said hub to the spindle, substantially as described.

20. The combination, with a revoluble hollow spindle, as 74, mounted in bearings in the head-stock of a milling-machine and adapted to receive and hold a chuck inserted within said hollow spindle at one end, of an index-plate secured thereto, whereby the step-by-step movements of the spindle and chuck are indicated and determined, and a draw-in spindle, as 67, inserted within the hollow spindle and adapted to engage with and secure said chuck to the spindle, substantially as described.

21. The combination, with a revoluble hollow spindle, as 74, provided with a worm wheel adapted to be secured thereto or loosened therefrom, a chuck, and a draw-in spindle for holding said chuck within said hollow spindle, of a worm-shaft and worm engaging with said worm-wheel, substantially as described.

22. The combination, with a revoluble hollow spindle, as 74 provided with a worm-wheel adapted to be secured thereto or loosened therefrom, a chuck, and a draw-in spindle for holding said chuck within said hollow spindle, of a worm-shaft and worm engaging with said worm-wheel and an index-plate secured to the hollow spindle, substantially as described.

23. The combination, with a revoluble hollow spindle, as 74, provided with a worm-wheel adapted to be secured thereto or loosened therefrom, a chuck, and a draw-in spindle for holding said chuck within said hollow spindle, of a worm-shaft and worm engaging with said worm-wheel, an index-plate secured to said hollow spindle, and a pawl adapted to engage the index-plate, substantially as described.

24. The combination, with a revoluble spindle, as 74, provided with a worm-wheel adapted to be secured to or loosened therefrom, and an index-plate secured to said spindle, of a worm shaft provided with a worm engaging with said worm-wheel, and an index-plate secured to said shaft, substantially as described.

25. The combination, with a revoluble spindle, as 74, provided with a worm-wheel adapted to be secured to or loosened therefrom, an index-plate secured to said spindle, and a pawl adapted to engage the index-plate, of a worm-shaft provided with a worm engaging with said worm-wheel, an index-plate secured to said shaft, and a pawl adapted to engage with the index-plate, substantially as described.

26. The combination, with a revoluble spindle, as 74, provided with a worm-wheel, and a shaft provided with a worm engaging with said worm-wheel, of an index-plate secured to said shaft, a pawl engaging with said index-plate, a yoke, as 45, supporting said pawl, and an adjustable holdfast-stud, as 41, for preventing the yoke from rotating with the shaft or allowing it to rotate therewith, substantially as described.

27. The combination, with a revoluble spindle, as 74, provided with a worm-wheel, a shaft provided with a worm engaging with said worm-wheel, and an index-plate secured to said shaft, of a sleeve, as 46, surrounding said shaft and provided with a bevel-wheel, a yoke, as 45, supported upon said sleeve, and provided with a pawl for engagement with the index plate, and connections with the said bevel-wheel for rotating the shaft, substantially as described.

28. The combination, with the worm shaft 49, provided with an index-plate, 78, of a sleeve surrounding said shaft and provided with a bevel-gear, a yoke, 45, supported by said sleeve and having a pawl for engagement with the index-plate, and an adjustable holdfast stud for securing said yoke in position against revolving with the index-plate and worm-shaft, substantially as described.

29. The combination, with the worm shaft 49, provided with an index-plate, and a sleeve surrounding and loose upon said shaft and provided with connections by which it is rotated, of a pawl engaging with the index-plate and a yoke supporting said pawl and mounted upon the sleeve, whereby said sleeve and shaft are coupled together, substantially as described.

30. In a milling-machine, the combination, with the shaft of a worm-indexing mechanism, of a yoke which by its lower extremity is rigidly held upon a sleeve by a nut, such sleeve terminating in a bevel-wheel which is revoluble with the yoke upon the worm-shaft, a spring-pawl carried by said yoke, and adapted, as described, to act as a stop for the sector of the indexing mechanism, and to engage with the notches upon the periphery of the index-plate, substantially as described.

31. In a milling-machine, the combination, with a yoke which provides a seat for a pawl, of a spring-seated pawl which is supported by said yoke, and which is provided with a tooth for engagement with the notches of an index-plate, the yoke and the index-plate being supported upon the same bearing, substantially as described.

32. The combination, with the yoke 45, carrying a pawl for engagement with an index-plate, of a holdfast-stud, 41, seated in the head and engaging with a recess in said yoke, and provided with a spiral groove, and a set-screw, 40, taking into said groove, substantially as described.

33. The combination, with a shaft, an index-plate secured thereto, its engaging-pawl, and a yoke carrying said pawl, and a sleeve loose upon said shaft and supporting said yoke, of an adjustable holdfast-stud, as 41, seated in the head and adapted to secure said yoke in a fixed position, and to release the same to permit the shaft and sleeve to rotate together, substantially as described.

34. The combination, with the head-stock 70, of the worm-shaft 49, the sleeve 47, which is provided with a shoulder or recess engaged by a screw, and the nut 66, substantially as described.

35. The combination, with the head-stock 70, having the bracket 105, of the worm-shaft 49, the sleeve 46, the encircling-yoke 45, and the holding-nut 44 at the outer end of said sleeve, substantially as described.

36. The combination, with the bracket 105 upon the head-stock 70, of the worm-shaft 49, the sleeve 46, the yoke 45, and the holding-nut 44, substantially as described.

37. The combination, with the bracket 105 upon the head-stock 70, of the worm shaft 49, the sleeve 46, terminating in a bevel-wheel, 24, the yoke 45, having a rear recess, the holdfast-stud 41, and the holding-nut 44, substantially as described.

38. The combination, with the bracket 105 upon the head-stock 70, of the shaft 49, the yoke 45, which encircles the shaft and its sleeve, and the holding-stud 41, which engages both the bracket and the yoke, substantially as described.

39. The combination, with a spindle, as 74, of an index-plate and its hub secured thereto, the index-plate being detachable therefrom independent of its hub, substantially as described.

40. The indexing mechanism 39 37, jointly with the spindle 74, substantially as described.

41. The combination, with a hollow spindle, as 74, and its chuck, and having a draw-in spindle, of an index-plate and its hub secured to said hollow spindle between it and the head of the draw-in spindle, the index-plate being detachable therefrom independent of its hub, substantially as described.

42. The combination, with the hollow spindle 74, provided with a draw-in spindle, and having a hub, as 37, secured to it, of an index-plate, as 39, mounted on said hub and detachable therefrom, substantially as described.

43. The combination, with a spindle, as 74, provided with a divided worm-wheel, as 23, of an adjusting key, 117, for adjusting the sections of said divided wheel with respect to each other, substantially as described.

44. The combination, with a spindle, as 74, provided with a divided worm-wheel composed of two sections, 114 115, the former of which is provided with an inclined recess, of an adjusting-key, 117, provided in the section 115 engaging with said inclined recess of the other section, substantially as described.

45. The herein-described sector-arms 55 56, the latter mounted on the hub of the other, one of which is provided with a spring-seated stop, as 19, substantially as described.

46. The combination, with an index-plate, as 78, and its engaging-pawl, of sector-arms 55 and 56, one of which is provided with a spring-seated stop, as 19, substantially as described.

47. In a milling machine, the combination, with a sector-arm in an indexing apparatus, the axis of the sector-arm being the axis of the index-plate of the indexing apparatus, of a spring-seated stop which is pivoted to such sector-arm, whereby the stop is made operative when the sector is moved in one direction, substantially as described.

48. In a milling machine, the combination, with a worm-shaft, of an indexing-sector which is applied to such shaft, and which is composed of two arms, one of which in its annular or axial portion is sleeved upon the other, and is clamped thereto, and which has upon it a pivotal spring-seated stop, substantially as described.

49. In a milling-machine, the combination, with a bearing-shaft which carries an index-plate, of a yoke, one end of which encircles such shaft, a spring-pawl carried by said yoke, and a sector or dividing apparatus which is sleeved upon such shaft, one of the arms of the sector being provided with a stop which is adapted in the manner described to engage with the point of the spring-pawl when moved in one direction, and to pass by the same when moved in the opposite direction, substantially as described.

50. In a milling-machine, the combination, with a revoluble shaft upon which is an index-plate, of a yoke, one end of which encircles such shaft, and which carries at its opposite end a spring-pawl, and a sector or dividing mechanism which consists of two arms which are sleeved together upon the shaft and are secured thereon by a screw, and one of which carries a spring-seated stop, whereby, when the sector is used in making divisions, it will be stopped at regular intervals by the spring-pawl, substantially as described.

51. The combination, with a feed-table, as 90, provided with a lateral feeding-screw shaft having a bevel-wheel, as 111, mounted loose thereon, of the clutches 30 31, one mounted so as to have longitudinal movement on the shaft and the other secured to said bevel-wheel, substantially as described.

52. The combination, with a feed-table, as 90, provided with a lateral feeding-screw shaft having a bevel-wheel, as 111, mounted loose thereon and carrying one part of a clutch, as 30, of the clutch 31, mounted so as to have longitudinal movement on said shaft and secured to a rod, 32, for operating it, substantially as described.

53. The combination, with a feed-table, as 90, provided with a lateral feeding-screw shaft having a bevel-wheel, as 111, mounted loose thereon and carrying one part of a clutch, as 30, of the clutch 31, mounted so as to have longitudinal movement on said shaft, and a shifting-rod, as 113, and connections between it and said clutch 31 for operating the same, substantially as described.

54. The combination, with a feed-table, as 90, provided with a lateral feeding-screw having a bevel-wheel, as 111, mounted loose thereon and carrying one part of a clutch, as 30, of the clutch 31, mounted so as to have longitudinal movement on said shaft, its rod 32, connecting-bar 28, and shifting-rod 113, substantially as described.

55. The combination, with a feed-table, as 90, provided with a lateral feeding-screw shaft having a bevel-wheel, as 111, mounted loose thereon and carrying one part of a clutch, as 30, of the clutch 31, mounted so as to have longitudinal movement on said shaft, and a shifting-rod, as 113, and connections between it and said clutch 31, for operating the same, and a stop, 14, co-operating with an arm provided on said shifting-rod, substantially as described.

56. The combination, with a feed-table, of supporting studs or guides which are attached to the feed-table, a shifting-rod which is adapted to slide in the stud or guide-supports, and a shifting-lever which has its fulcrum in the body of the feed-table, substantially as described.

57. The combination of a feed-table, a shifting-rod which is supported upon projecting arms or studs which are attached to the feed-table, and a shifting-lever which has its fulcrum in or upon the feed-table, substantially as described.

58. The combination of a feed-table, a shifting-rod which is supported by the feed-table, but which is exterior thereto, a shifting-lever the fulcrum of which is the feed-table, a connecting-arm which is adjustably attached to the shifting-bar, a clutch which is attached to the connecting-arm, and a bevel-wheel which is applied upon the clutch, substantially as described.

59. The combination, with a feed-table which is provided with a cavity, of a shifting-rod and a shifting-lever which engages with the cavity in the feed-table, substantially as described.

60. In a milling-machine, the combination of a feed-table, 90, a shifting-lever, 26, an exterior shifting-rod, 113, a connecting-arm, 28, which is connected to the shifting-rod, and a sliding clutch-shaft, 32, which is revoluble in one end of the connecting-arm, substantially as described.

61. In a milling-machine, the combination of a feed-table, 90, a shifting-lever, 26, an exterior shifting-rod, 113, a connecting-arm, 28, which is attached to the shifting-rod, and a slidable clutch-shaft, 32, which is revoluble in one end of the connecting-arm, substantially as described.

62. The combination, with the body of a milling-machine, of a pivoted stop which is secured to such body, and which is adapted, as described, to engage with a projection upon the shifting-rod of the machine when the feed-table is moved in one direction, and to fall and permit unrestricted movement when the feed-table is moved in the opposite direction, substantially as described.

63. In a milling-machine, the combination of the pivoted or swiveled stop 14, secured to a fixed portion of the machine, with the shifting-rod 113, provided with an adjustable stop, 15, substantially as described, whereby movement of the feed-table in one direction may be limited, while in the opposite direction it will be unrestricted, substantially as described.

64. A tail-stock which is provided with a central slot, a circular or other shaped longitudinal horizontal opening at the lower extremity of the slot, and a clamping-screw which engages with both sections of the tail-stock, substantially as described.

65. The combination, with a vertically-slotted tail-stock, of a spindle which is engaged directly by the walls of the slotted portion of the tail-stock, substantially as described.

66. The combination, with a vertically-slotted tail-stock, of a spindle which is flattened upon its surface, and which is engaged directly by the slotted portions of the tail-stock, substantially as described.

67. The combination, with a vertically-slotted tail-stock, of a spindle which is engaged directly by the walls of the slotted portion of the tail-stock, and a clamping-screw which extends through one of the vertical portions of the tail-stock and engages with the other vertical portion, substantially as described.

68. The herein-described tail-stock 60, provided with a curved seat for the tail-stock spindle, the central longitudinal slot, 64, its opening 68, and a binding screw or bolt, 65, substantially as described.

69. The combination, with a tail-stock, 60, provided with a curved seat in its upper portion, of a spindle, 61, and an independent taper-shanked center, substantially as described.

70. The combination, with a centrally-slotted tail-stock, of a tail-stock spindle, a central adjusting-screw which engages with such spindle, and a clamping-screw which extends crosswise through the two sections of the tail-stock and holds the tail-stock spindle rigidly in place, substantially as described.

71. The combination, with the tail-stock provided with a curved seat, a central longitudinal slot, and a binding screw or bolt, 65, of a spindle, 61, adapted to hold a taper-shanked center, and provided with depending bifurcated end 62, and an adjusting-screw engaging therewith, substantially as described.

72. The combination of a spindle which is provided with a perforation which is adapted to receive a securing-key, a device for holding the work which is to be operated upon, which device is provided with a shallow slot, a securing-key which is adapted to engage with the perforation in the spindle and with the slot in the work-holding device, and a screw which is adapted, in the manner described, to hold the key in its place, substantially as described.

73. In a milling-machine, the combination, with the feed-screw 95, of the cross-feed slide, the feed-screw being provided with a shoulder, 11, of a screw-sleeve or adjusting-screw, 10, which encircles the shaft end of the screw, and an interiorly-threaded plate, 94, through which the screw-sleeve 10 is adjusted, substantially as described.

74. The herein-described spring-chuck, the radial slits whereof terminate in enlarged slots 21, substantially as described.

VICTOR H. ERNST.

Witnesses:
JOHN H. McCULLOUGH,
OTTO ERNST.